United States Patent [19]

Beaufoy

[11] Patent Number: 4,697,263
[45] Date of Patent: Sep. 29, 1987

[54] TIME SLOT ARRANGEMENTS FOR LOCAL AREA NETWORK SYSTEMS

[75] Inventor: Raymond Beaufoy, Maidenhead, England

[73] Assignee: Plessey Overseas Limited, Ilford, England

[21] Appl. No.: 518,476

[22] Filed: Jul. 29, 1983

[30] Foreign Application Priority Data

Aug. 4, 1982 [GB] United Kingdom ............... 8222529

[51] Int. Cl.$^4$ .......................... H04J 3/02; H04J 3/06; H04L 7/00
[52] U.S. Cl. ..................... 370/85; 370/103; 370/104; 375/107
[58] Field of Search ..................... 370/85, 91, 92, 103, 370/104, 94, 89, 79, 100; 340/825.5; 375/107, 117

[56] References Cited

U.S. PATENT DOCUMENTS

| | | | |
|---|---|---|---|
| 3,641,274 | 2/1972 | Sasaki et al. | 370/104 |
| 3,668,315 | 6/1972 | Heitzman | 375/119 |
| 3,818,447 | 6/1974 | Craft | 370/85 |
| 3,846,587 | 11/1974 | Schenkel et al. | 370/85 |
| 3,856,993 | 12/1974 | Closs et al. | 370/85 |
| 3,859,465 | 1/1975 | Schenkel et al. | 370/85 |
| 4,156,112 | 5/1979 | Moreland | 370/85 |
| 4,199,663 | 4/1980 | Herzog | 370/85 |
| 4,404,557 | 9/1983 | Grow | 370/84 |
| 4,464,749 | 8/1984 | Ulug | 370/85 |
| 4,509,170 | 4/1985 | Hollinger | 370/85 |
| 4,653,049 | 3/1987 | Shinmyo | 370/103 |

FOREIGN PATENT DOCUMENTS

| | | | |
|---|---|---|---|
| 0041429 | 5/1981 | European Pat. Off. | 370/110.1 |
| 1184108 | 3/1970 | United Kingdom | 370/100 |
| 1203422 | 8/1970 | United Kingdom | 370/100 |
| 1224750 | 3/1971 | United Kingdom | 370/100 |
| 1286157 | 8/1972 | United Kingdom | 370/104 |
| 1289051 | 9/1972 | United Kingdom | 370/104 |
| 1314180 | 4/1973 | United Kingdom | . |

OTHER PUBLICATIONS

D. Scavezze, "Electronics International", vol. 54, No. 12, Jun. 16, 1981.

Primary Examiner—Douglas W. Olms
Assistant Examiner—Frank M. Scutch, III
Attorney, Agent, or Firm—Fleit, Jacobson, Cohn & Price

[57] ABSTRACT

In local area networks (LAN's) which are required to operate in duplex mode it is necessary for the common communication medium to be operated in a t.d.m. manner. Because the LAN has no common equipment, every station is arranged to contain its own control circuitry and crystal controlled clocking system to produce time slot markers. The system is organized so that each time slot comprises an active period for data or speech transmission or contention resolution, followed by a transit period in which the data or speech reaches the destination. Ideally time slot markers occur simultaneously in both stations and for intermediate stations there is a tolerance which reaches a maximum at the midway point of the network communication medium. The multiplexing system arranges that the time slots are packed as closely together as the delay between most separated stations will allow. The near simultaneous occurrance of time slot markers is maintained by all stations whether busy or free by observing the timing of traffic on the communication medium and adjusting the timing of the station time slot marker to occur in the time between data or speech bursts of existing traffic.

13 Claims, 7 Drawing Figures

TIME SLOT ARRANGEMENTS FOR LOCAL AREA NETWORK SYSTEMS

BACKGROUND

The present invention relates to local area network systems for use with computer and office automation systems and is more particularly concerned with arrangements for defining time slots on the common communication medium which is operated on a time division multiplex basis.

A typical example of time division multiplex operated systems is shown in U.K. Pat. No. 1,314,180. In such systems there is a common medium for communication and each subscribers station connected thereto contains its own control and clocking system. Typically a crystal controlled oscillator experiences drift of the order of one in 10 which, at a transmission bit rate of the order of 5.12M bits per second, gives a one bit drift in every six frames. The system clock is arranged to divide down the bit rate oscillator to produce common medium time slots and frames for the station. The multiplexing system used in such a local area network requires to pack the time slots as closely together as the delay between the most separated subscribers stations will allow, to efficiently use the common medium.

It is an object of the present invention to achieve the above requirement.

SUMMARY OF THE INVENTION

According to the invention there is provided a communication system comprising a common communication medium and a plurality of subscribers interface units each connected to the common medium and each interface unit includes a data transmission arrangement for transmitting data information signals onto the medium and a data reception arrangement for receiving data information signals from the medium, the medium being arranged to operate in accordance with a time division multiplex in which each time slot includes an active period for the transmission of a data burst of data information signals and a transit period and each interface unit includes internal timing arrangements and means for observing the timing of traffic burst on the highway and means for adjusting the internal timing arrangements so that the time slot timing cycle within the interface unit corresponds with that of the data on the highway.

The data signals, which may include speech, take any well known form, such as digital signals in Manchester code or analogue or digital modulated carrier, sometimes know as broadband, and the medium may be electrical cable, optic fibre or broadcast by electromagnetic, ultrasonic or infrared, by suitable system design.

The internal timing arrangements are arranged to produce a time slot marker which nominally occurs at the mid-point of the transit time of each time slot. Typically time slot marker adjustment occurs in accordance with the following:

|  | If own marker would occur | Action |
|---|---|---|
| (i) | clear of existing traffic | Continue as before |
| (ii) | in the first half of a data burst | Move own t.s. to start of data burst |
| (iii) | in the second half of a data burst | Move own t.s. to end of data burst |
| (iv) | in unbroken continuous | Continue as before |

| If own marker would occur | Action |
|---|---|
| data | |

This arrangement achieves the near simultaneous occurence of time slot markers by all interface units be they busy or free, by each unit observing the timing of traffic bursts on the highway and adjusting the internal timing time slot marker to occur in the time between data bursts of existing traffic (i.e. in the transit period of each time slot).

To accommodate long continuous bursts of data at maximum line rate occupying many time slots it is necessary to have an arrangement whereby the time slot marker arrangement is not corrupted. The above rules achieve this by making corrections dependent on discrete bursts bounded by gaps, which continuous data will not have.

A station intending to send a long burst of continuous data at fill line rate must restrict the frequency and length of such bursts so as to not corrupt speech channels unduly as these will discard the speech samples for the period of the long burst; data channels must store their data until their channel is again available.

If required the long burst station can broadcast a message in its first time slot to warn multiplexed stations that their time slot will be 'grabbed', but this is not essential for synchronisation purposes.

BRIEF DESCRIPTION OF THE DRAWINGS

The invention will be more readily understood from the following description of one embodiment which should be read in conjunction with the accompanying drawings.

Of the drawings:

FIG. 6 shows the logic and waveforms for time slot synchronisation, while

DETAILED DESCRIPTION OF THE DRAWINGS

The embodiment of the invention uses a co-axial cable communication medium COCM which is terminated in its characteristic impedance CIA and CIB at each end. Connected to the communication medium are a number of interface units I/FA, I/FB, I/FC, I/FD, I/FE, I/FF, I/FG and I/FX which match the various subscriber terminals of the local area network to the communication medium COCM. The communication medium is operated on a time division multiplex basis with 32 duplex channels operating at a nominal 5 Mb/s rate. Each channel may consist of a 'go' slot and a 'return' slot. Alternatively the full time slot can be used alternately in the 'go' and 'return' direction using the structure of FIG. 2. A line of text can be contained in one simplex time slot of 448 bits. The terminals connected to the system will vary of course depending upon the requirements of the system. Typically microprocessor based terminals such as MPT can be connected to the medium as can bulk data storage equipment MTE. Similarly digital telephones DTA and DTB allow for voice communication in addition to the handling of computer based data. In addition dedicated special purpose stations may be provided for (i) digital telephone conferencing, (ii) short code dialling, (iii) external connection to public or private communication networks ETE, (iv) voice recording, (v) network usage accounting and (vi) protocol conversion stations. Obviously the data processing stations may include (i) word processors, (ii) access units for a main frame computer system, (iii) line printers, (iv) facsimile equipment FE, (v) acoustic couplers for passing data over the public telephone network and (vi) bulk storage data bases DBE.

Each equipment connected to the local area network is interfaced by its own dedicated interface unit which may be particularised to the equipment, from a network point of view, by the use of a discrete equipment address number. However, concentrators for similar or mixed terminal types may share special interfaces.

As mentioned previously the communication medium is operated on a time division multiplex basis and a typical set of parameters for the medium is shown below:

Number of time slots per frame: 32
Duration of each time slot: 100 us
Data bit rate: 5.12 Mbit/s
Packet length: 60 bytes (480 bits)

Figure 1:
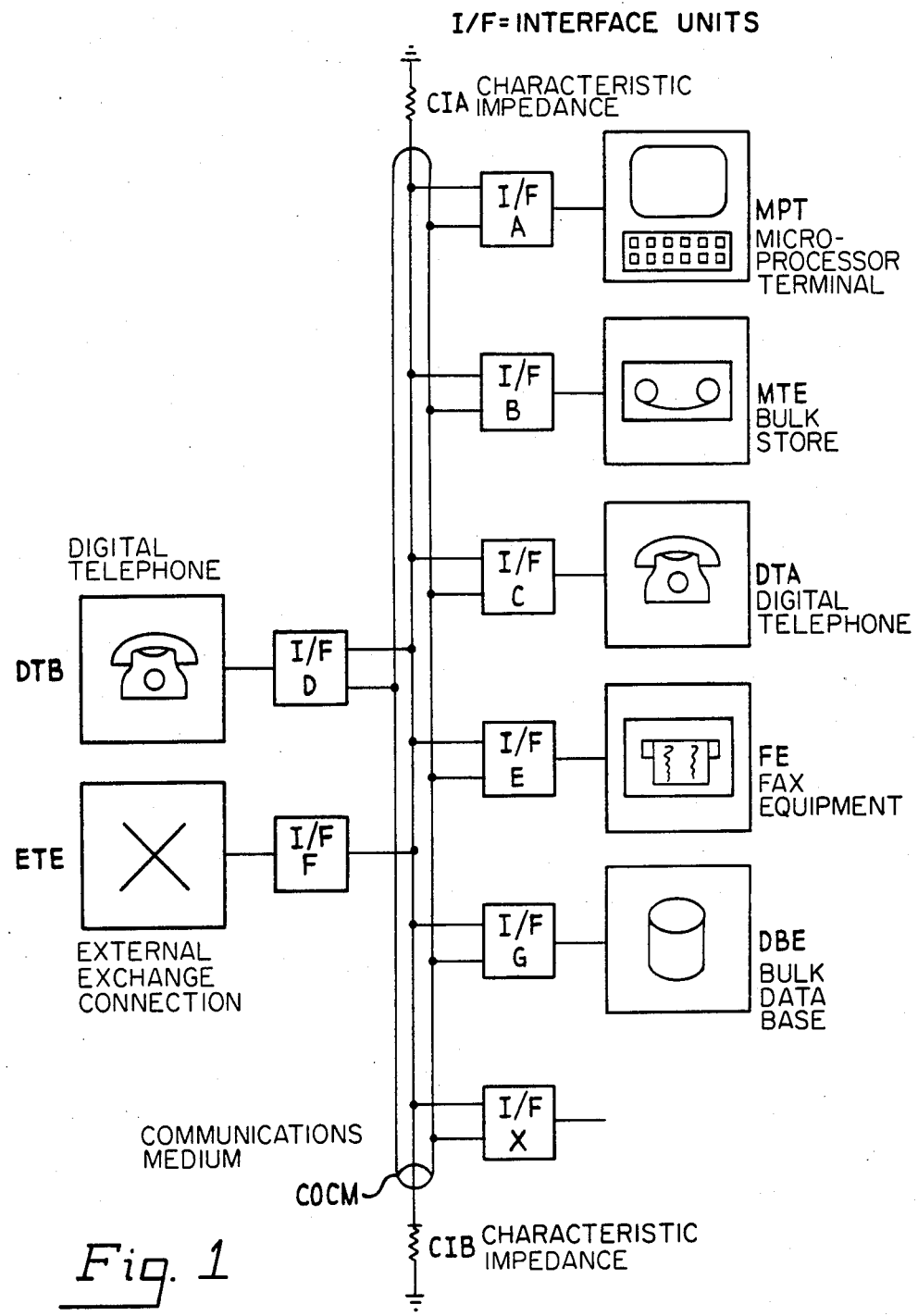
FIG. 1 shows in block form the system according to one embodiment of the invention.
Figure 2:
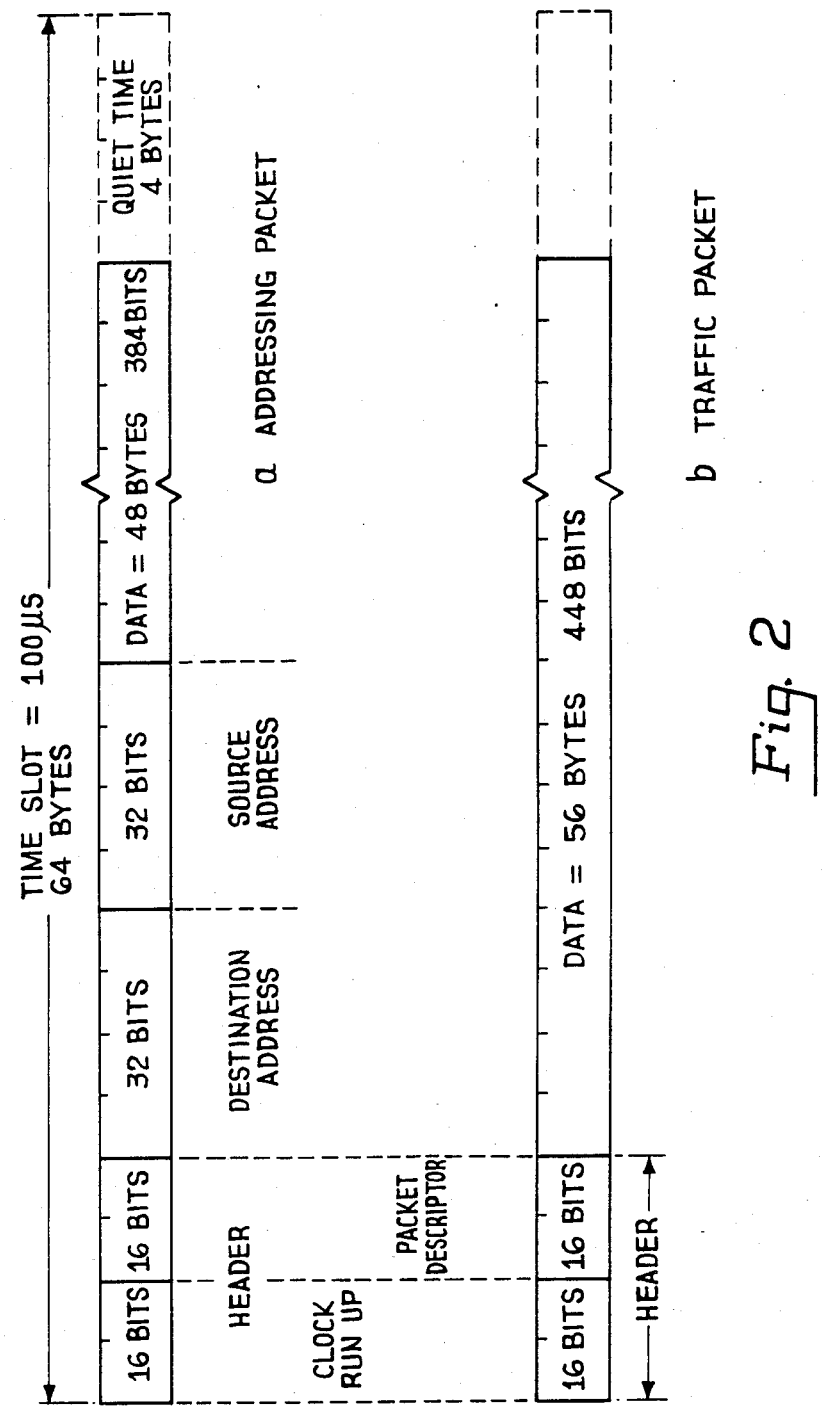
FIG. 2 shows suggested packet structures for the embodiment of the system.

FIG. 2 shows a suggested structure of two packet types which would fit into the time slot. These packets are an addressing packet and a traffic (data) packet. The addressing packet would be used for setting up a channel in the TDM frame; traffic packets would then be sent until the transaction was complete. Using the parameters proposed, the maximum data rate which can be carried in 1 time slot per frame is 150 Kbit/s.

Time slots will be arranged to suit the traffic carried by the system, in the case of a system carrying speech and data a convenient choice is for a duplex time slot which provides for a group of speech samples (octets) in both directions.

This same time slot can be used in a number of ways to carry data on a simplex, duplex or polling basis.

To achieve greater throughput, speech may be handled on the well known TASSI basis where a simplex time slot is seized only during a speech burst.

The communication medium may be a co-axial cable using line coding of the Manchester code type and the header in each slot may be used to provide bit phase synchronisation.

Figure 3:
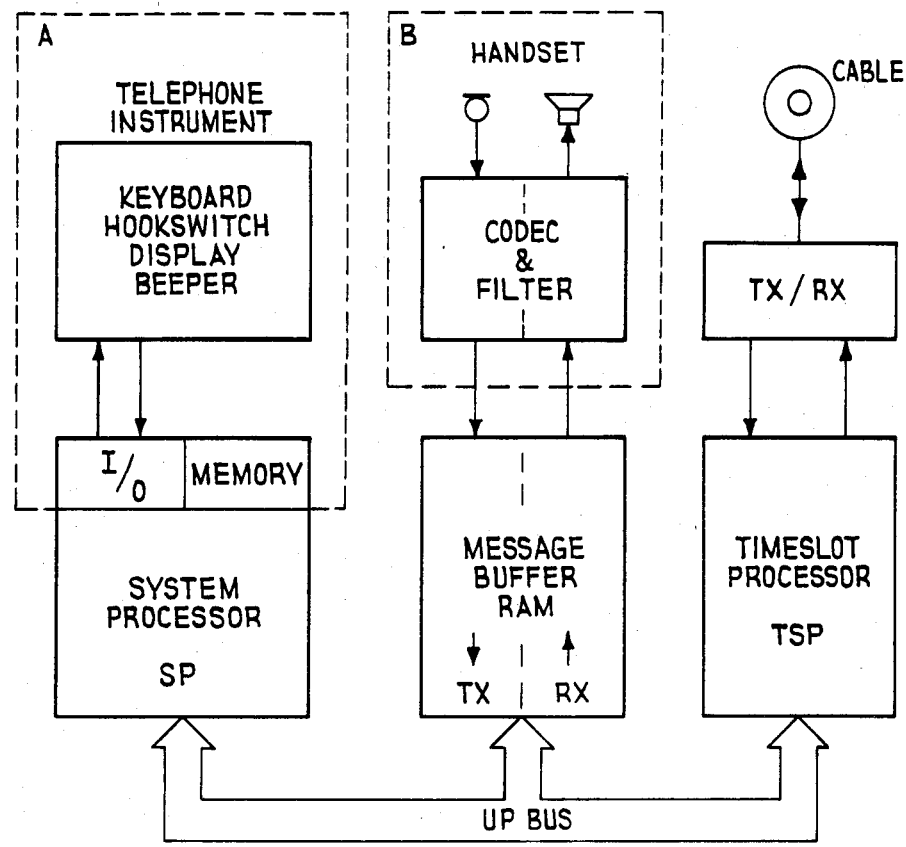
FIG. 3 shows a voice station interface unit block diagram.

The data stations (interface units) as mentioned previously interface the equipment to the communication medium. FIG. 3 shows a block diagram of a speech station.

The time slot processor TS area must perform the functions of maintaining time slot synchronism, achieving slot access by contention when commanded, and receipt and transmission of packets are required. The time slot processor will be under the control the station microprocessor. It will have sufficient power to transmit in one time slot per frame, but must listen to each time slot, compare the station address with the packet address and interrupt the microprocessor when they match.

The system microprocessor SP performs the functions of status monitoring, implementing the station facilities and performing various housekeeping functions such as self-test and call logging.

Supervisory tones have been the traditional method of prompting the user and of providing information on system status. If these are still required when they must be generated within the stations, possibly by using the computing power of the microprocessor to load tone patterns into the receive buffer for conversion to audio by the CODEC. If a suitable display is included in the telephone, then the need for supervisory tones is reduced.

The time slot processor TSP is responsible for the generation of a time slot marker which defines each time slot for the interface unit. Recapping the system operates on a distributed synchronisation process which means that:

(1) There is no master clock.
(2) Each interface terminal has a crystal controlled clock, but small variations of frequency from the nominal cause the terminal clocks to drift apart; some are fast and some are slow.
(3) Due to propogation delay, a 100 us burst of data transmitted by any one interface terminal is received at different times by all other interface terminals.
(4) To synchronise, each interface terminal is required to adjust its clock so as to align in time with the start or end of the packet of data it observes.
(5) Between busy slots each terminal drifts and is synchronised by the transmitter who uses the next busy slot.

Alignment

The objective of any alignment algorithm is to adjust each interface terminal clock so that repeated adjustment of all clocks will result in all terminals maintaining synchronism in a stable fashion.

Figure 4:
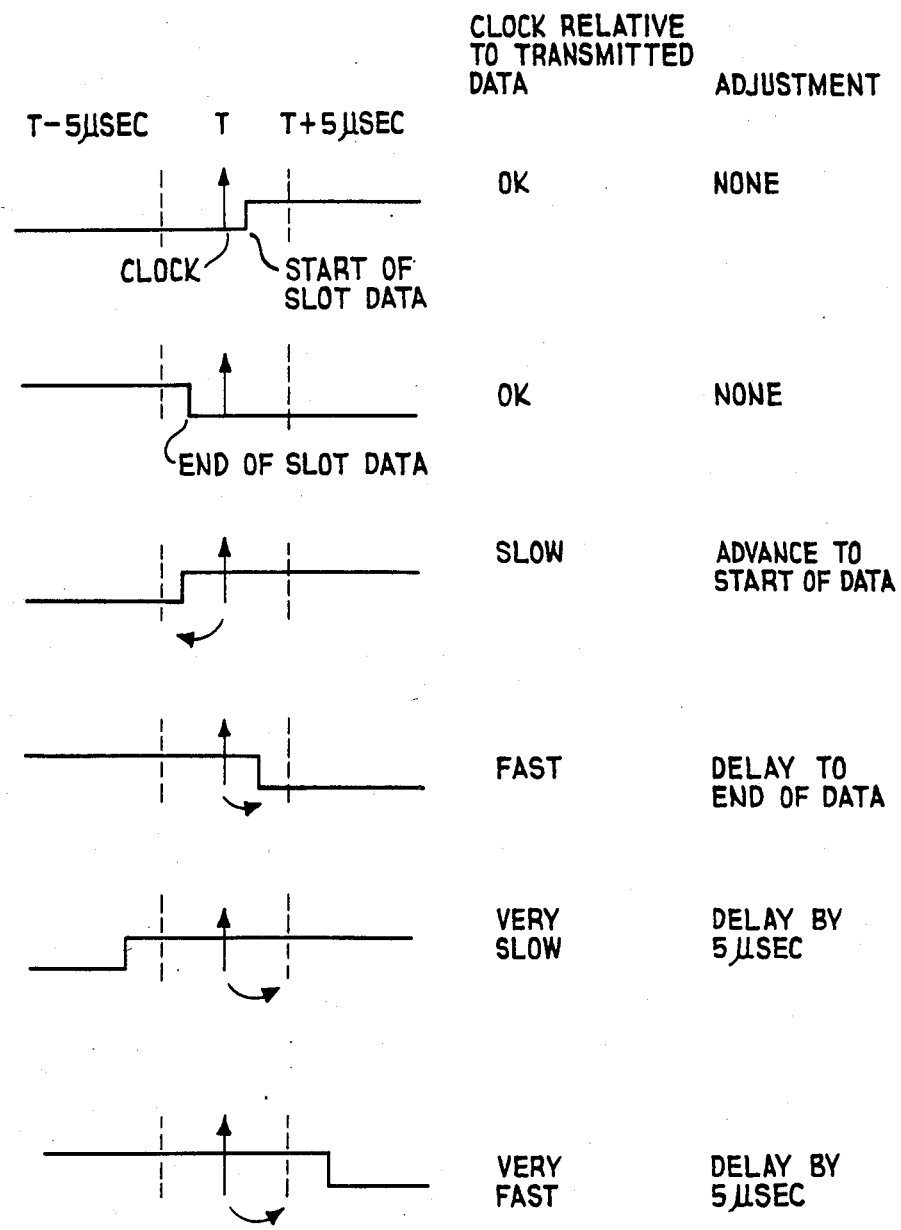
FIG. 4 shows waveform diagrams of the Alignment procedure.

FIG. 4 illustrates the alignment procedure. If the packet of data observed by a terminal lies between two time slot markers, then this terminal is synchronised and no adjustment is necessary. At terminal is slow if the start of the data received occurs earlier than the terminal time slot marker. To realign the terminal clock to the received data the clock is advanced. If the end of a packet is received later than the time slot marker, the terminal is fast and its clock should be retarded.

Figure 5:
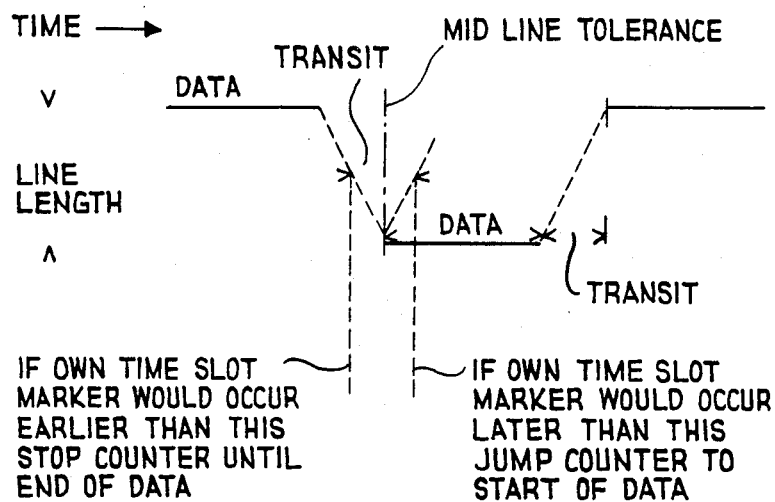
FIG. 5 shows waveform diagram of the time slot start positioning.

FIG. 5 shows the time relationship between bursts of data in time adjacent channels but from stations at opposite ends of a highway. The time slot comprises an active period for data or speech or contention resolution, followed by transit period in which the data reaches the opposite end of the highway.

The time slot markers ideally occur simultaneously in both stations and for intermediate stations there is a tolerance which reaches maximum at the midway point.

This near simultaneous occurrence of time slot markers is maintained by all stations whether busy or free, observing the timing of traffic bursts on the highway and adjusting the timing of their time slot marker to occur in the time between data bursts of existing traffic.

Thus it can be seen that all stations are prepared to send traffic with the current timing.

In the total absence of traffic, or when the system is started up, the first station to transmit will align the others immediately.

Summing up, the simple rules for time slot marker adjustment are as follows:

| If own marker would occur | Action |
| --- | --- |
| Clear or existing traffic | Continue as before |
| In the first half of data burst | Zero counter at start of data burst |
| In second half of data burst | Zero counter at end of data burst |
| In continuous data | Continue as before |

Use of Time Slot Markers

The time slot markers indicate to the station circuitry.

(1) In the case of an established multiplex call, when to start transmitting data or busy signal, in conjunction with the appropriate channel signal from the frame marker.

(2) In the case of searching for a free time slot, the beginning of the period of zero signal after which the time slot is considered free.

Figure 6:
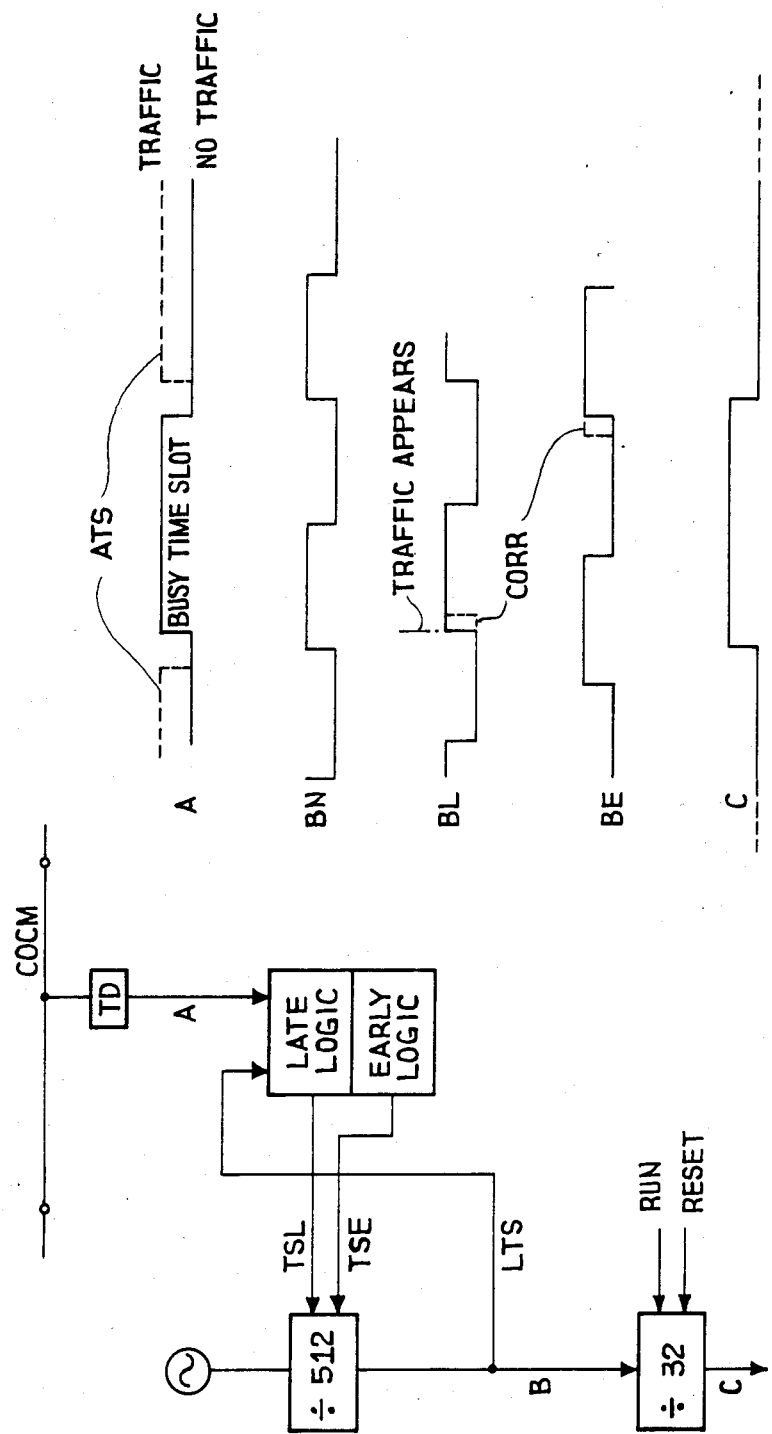

FIG. 6 shows in block form the equipment required in the time slot processor TSP of FIG. 3. The equipment requires a traffic detector TD adapted to produce waveform A indicative of a busy time slot. The dotted lines referred ATS on waveform A indicate the effect of adjacent time slots if they were busy. The traffic present waveform A is applied to a logic block LB which is divided into two sections responsible for late detection LD and early detection ED. Also fed to the logic block LB is a waveform indicative of the local time slot from the local interface unit's timing generator TG. The local time slot is depicted in waveform B. In fact three versions of waveform B are shown in FIG. 4 as BN, BL and BE indicating the three conditions which can occur (i.e. local time slot normal BN, local time slot late BL and local time slot early BE), in addition to zero traffic and continuous traffic.

The local interface unit timing generator TG consists of a crystal controlled oscillator, operating at say 5.12M Hz driving a divide-by-512 divider TS DIV to generate 100 u Second time slots. The divider TS DIV drives a divide-by-32 divider FDIV which is used to generate waveform C to define the time division multiplex frame of 3.2 milliseconds. This counter can be used to identify the time slot which has been seized by this interface unit when it is busy. The counter FDIV is controlled so that (a) it can count time slots when the interface unit is seeking or using a time slot and (b) it is reset if the unit is seeking a time slot and loses contention or the time slot is busy. The logic used in the late LD and early detection ED equipment will be realised as part of an integrated circuit chip although it could be standard logic or software on a microprocessor. When the late detector operates (i.e. waveform BL) a signal is produced on lead TSL to drive the counter of the TS DIV to zero, as the local time slot has been adjuged late with respect to that on the communication medium. When the early detector ED operates (i.e. waveform BE) it produces a signal on lead TSE to reset the TS DIV counter to zero if and when the traffic detector detects the traffic absent condition.

The above has indicated how the common medium can be operated on a time division multiplex basis which is so essential for devices which require to operate in a synchronous mode (for example speech). However, it is necessary for a local area network to be adapted to allow other modes of operation. One such mode of operation involves so-called 'system grab'. System grab requires that a long continuous burst of data at maximum line rate occupying many time slots can be transmitted.

While correcting synchronisation depends on discrete time slot length bursts of traffic, during continuous zero traffic or system grap traffic previous timing is maintained, with a drift due to crystal variations of about 1 bit in 6 frames.

On resumption of normal slotted traffic this drift is corrected instantly.

During a single frame's loss, speech stations will have to introduce 3.2 milliseconds of quiet in their audio path; at most, the user would notice a single click. The loss of access to one frame is normally even less severe for data stations since the traffic they are carrying will simply be held up for an extra 3.2 milliseconds.

The maximum data rate that can be transmitted over the common medium using one time slot per frame is 150 Kbit/s. This means that at the normal data circuit speeds (up to 9.6 Kbit/s) the system would operate inefficiently if one time slot were permanently allocated to one data circuit for the duration of the transfer. It can be seen that there is capacity for several data circuits to be multiplexed into one time slot. This would give a two-way benefit since the time slot could be used more efficiently and the per-port cost of several data connections would be reduced.

When considering the transfer of larger blocks of data, for instance, programs from floppy disc—across the common medium, then the data rate capacity is well suited to this. A 64 Kbyte program would be transferred in under 4 seconds, a 512×256 dot graphics image could be transferred to a screen in under one second.

It is possible, however, to pass data along the common medium faster than 150 Kbit/s; it can be sent at rates up to the burst data rate of 5 Mbit/s.

The high speed data stations may be equipped, for instance, with capacity to seize up to five time slots in a frame, dependent on the required data speed and the number of empty time slots.

Figure 7:
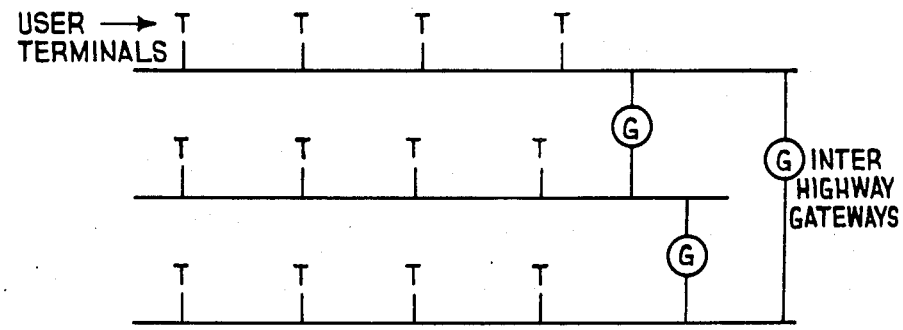
FIG. 7 shows how a multi-common medium system may be implemented.

Multi-Highway Systems FIG. 7

A number of highways can be linked with gateway stations between each pair, providing multi-channel time slot shifting transfer between them.

This greatly increases the traffic and terminal capacity of the system.

The physical location of the terminals of a system may be adapted to suit the circumstances. For example 'Go' and 'Return' wires may be provided with large amplification between to overcome attenuation when the common medium is an optical fibre link. Alternatively a common amplifier with long leads in and out to the station could be provided.

What we claim is:

1. A communication system comprising:
   a common communication medium being arranged to carry information on a time division multiplex basis in which each time slot includes an active period for the transmission of a burst of information signals and a transit period, the communication medium having no master clocking arrangement;

a plurality of subscribers interface units each connected to the common communication medium, each interface unit includes:

a data transmission arrangement for transmitting information signals on to the communication medium;

a data reception arrangement for receiving information signals from the communication medium;

an internal timing means arranged to produce timing signals on a time division multiplex basis with each time slot including said active period and said transit period with a time slot marker at the midpoint of the transit period of each internal time slot;

means for monitoring the timing of traffic data bursts on the communication medium and generating a time slot marker relevant to the communication medium time slot for detecting a predetermined descrepancy between the transit period produced by said internal timing means and the transit period of each of the time slots on the communication medium; and means for adjusting the internal timing means within each interface unit responsive to said means for monitoring so that the time slot timing cycle within the interface unit corresponds with that of the data signals on the communication medium.

2. A communication system as claimed in claim 1 in which the internal timing means comprise a source of clock pulses driving a time slot timing device and a frame timing device and the setting of these devices is controlled by the means for monitoring, upon detection of a predetermined discrepancy between the time slot markers.

3. A communication system as claimed in claim 2 in which the means for monitoring is arranged to set the time slot timing device to zero when the time slot marker on the common communication medium occurs during the active period of the interface unit internal timing cycle.

4. A communication system as claimed in claim 3 in which the means for monitoring is arranged to set the time slot timing device to zero at the start of an active period if the internal timing cycle time slot marker would occur in the leading half of the active period on the communication medium.

5. A communication system as claimed in claim 3 in which the means for monitoring is arranged to set the time slot timing device to zero at the end of an active period if the internal timing cycle time slot marker would occur in the trailing half of the active period on the communication medium.

6. A communication system as claimed in claim 2 in which each interface unit comprises (i) a time slot processor incorporating (a) said means for monitoring the timing of traffic bursts, and (b) said internal timing means, (ii) a message buffer providing storage for information signals to be passed to and received from said communication medium and (iii) a system processor interfacing said time slot processor and message buffer to the subscriber's equipment connected to the interface.

7. A communication system as claimed in claim 6 in which the interface unit is microprocessor controlled.

8. A data communication system as claimed in claim 7 in which the common communication medium provides a local area network incorporating both data handling equipment and voice communication equipment.

9. A data communication system as claimed in claim 8 in which each time slot on the communication medium comprises a go period and a return period.

10. A data communication system as claimed in claim 9 in which an interface unit is arranged to generate an addressing packet when initiating a correction to the common communication medium, said addressing packet defining the address of the, or each other equipment interface unit with which a communication correction is required.

11. A data communication system as claimed in claim 10 in which the identity of the required other equipment interface unit is applied in the go period.

12. A data communication system as claimed in claim 11 in which during a duplex communication interchange using the communication medium a traffic packet is applied to the same channel in each frame of the time division multiplex cycle of the medium.

13. A data communication system as claimed in claim 12 in which the time division multiplex basis of the common communication medium may be suspended to permit a long continuous burst of data at maximum communication medium transmission rate to be transmitted and each interface unit includes means for accumulating its traffic packets during the suspended period.

* * * * *